Patented Mar. 10, 1936

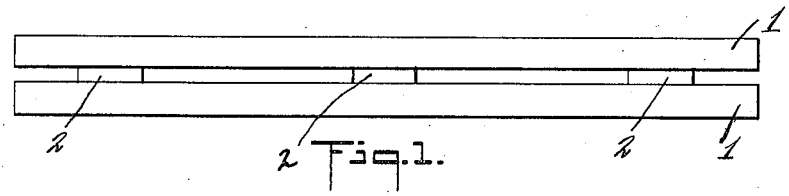
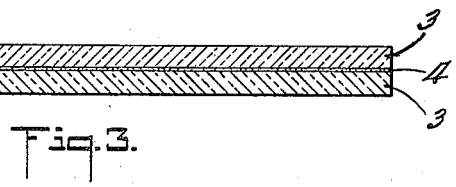
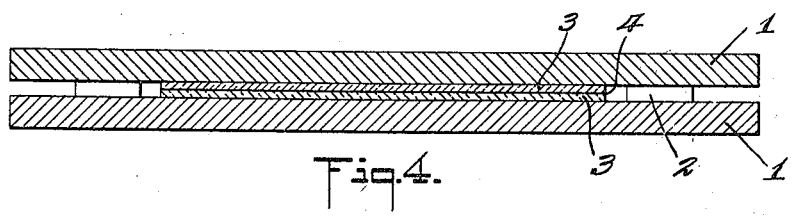
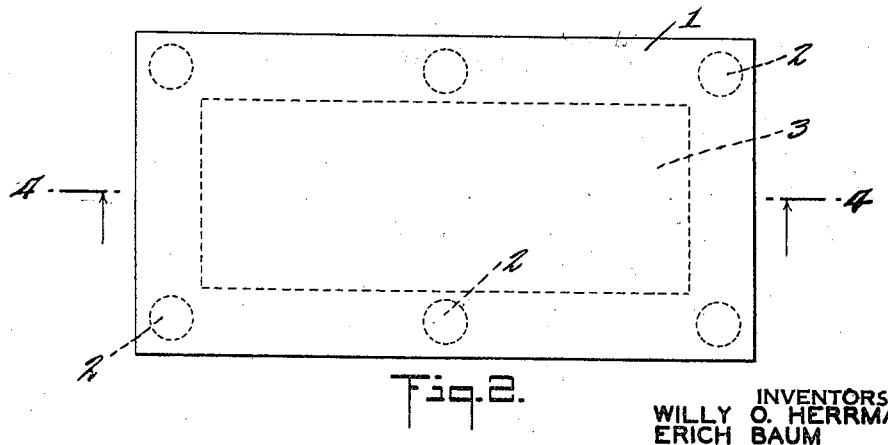

2,033,377

UNITED STATES PATENT OFFICE 2,033,377

LAMINATED GLASS

Willy O. Herrmann and Erich Baum, Munich, Germany, assignors, by mesne assignments, to Chemische Forschungsgesellschaft, m. b. H., Munich, Germany, a corporation of Germany Application March 8, 1932, Serial No. 597,450
In Germany March 25, 1931

4 Claims. (Cl. 49—81)

Heretofore laminated glass has been produced by relatively complicated methods. The glass was finished under high pressure by means of heated hydraulic presses, using expensive apparatus with considerable risk of breakage. Further there were some difficulties in obtaining laminated glass of equal thickness. Similar difficulties were also found in the manufacture of laminated glass with a homogeneous layer between the plates.

We have now found a new method of easily and simply manufacturing laminated glass of desired thickness without the use of expensive apparatus and without risk of breakage of the glass. The principle of our process is to select as a layer between the glass plates masses sufficiently liquid or plastic at the working temperature. Thus after being suitably heated the layer may be handled like a liquid.

Our process may be carried out by coating the glass plates in a suitable manner with a layer of the adhesive and mounting them between pressure surfaces such as a pair of horizontal metal plates heated to the desired temperature and capable of approaching each other to a limiting position corresponding to the desired final thickness of the laminated glass. The distance of the metal plates and accordingly the thickness of the glass layer is adjusted for instance by spacers, washers or the like of suitable thickness. When the adhesive has reached the temperature of liquefaction, the glass plates approach each other automatically by the weight of the upper metal plate to the desired distance. The duration of heating and the working temperature may vary between wide limits. They depend upon each other in such a manner that with a given material for the adhesive layer, by elevating the temperature, the duration of heating may be shortened and vice versa. They can be further varied by enlarging or reducing the amount of softeners in the adhesive layer or by altering the composition of the layer in any desired way. Thus the working temperatures vary from ordinary room temperature up to about 250° C., this temperature depending upon the nature of the adhesives and film materials used.

Finally the process may be carried out in such a manner that simply a mixture of suitable substances is interposed between the glass plates. The plates can be protected against displacement by means of a frame or any other suitable device. The plates are then heated for such a time to a suitable high temperature, till they are joined by a continuous layer free from bubbles. The surface tension acts like an internal pressure thus promoting the formation of a continuous layer, pressing out bubbles etc. The adjustment may be promoted by the pressure of a load, rolls, springs etc. If the plates are covered with the adhesive, suitable transparent or not transparent films may be interposed.

As components of the adhesive layer and adhesive masses, hereinafter called adhesive, all the substances hitherto used for the manufacture of laminated glass are suitable, in so far they are liquefied or plastified by heating. Such substances are especially the derivatives of cellulose, artificial resins like polymerized vinyl compounds, especially polymerized organic vinyl compounds, polymerized acrylic esters, polymerized itaconic esters, polymerized styrols etc. and the mixtures and compounds of those components combined with softeners of any kind.

The process cannot only be carried out in the manufacture of glass with a homogenous layer, but also when interposing between the plates a transparent film in combination with the adhesive layer. In this case only the adhesive must be satisfyingly liquid at higher temperatures. By our process also more than two glass plates may be combined. As material for the interposed transparent film, the same or other material as used for adhesive maybe employed e. g. cellulose esters, polymerized vinyl compounds etc. and also non-plastifiable or liquefiable transparent substances may be used such as caoutchouc derivatives.

The laminated glass thus produced is substantially free of any tension, while in the laminated glass manufactured by the usual pressing processes, tension perpendicular to the direction of the layer occurs. The absence of any tension causes a strength unknown up to this time in the manufacture of laminated glass. Therefore our process is especially suitable if starting from machined glass or in the manufacture of curved glass.

In the drawing illustrating the invention,

Fig. 1 is a side elevational view of the metal plates and washers,

Fig. 2 is a top plan view of the metal plates, washers and glass,

Fig. 3 is a vertical sectional view of two plates of glass separated by the adhesive and before being pressed, Fig. 4 is a sectional view on the line 4—4 of Fig. 2, and Fig. 5 is a vertical sectional view of the laminated glass with an inner celluloid film.

In the drawing, metal plates 1, 1, are separated by washers 2. Glass plates 3, 3 are covered with an adhesive 4, and the covered sides placed in contact, dried at an elevated temperature and pressed by metal plates 1, 1. If desired, a suitable transparent film 5 may also be inserted between the glass plates.

*Example I.*—100 parts by weight of a paste containing 40% of highly polymerized vinyl acetate dissolved in spirit are mixed with 15 parts of benzylbenzoate and 15 parts of the dimethylic ester of phthalic acid. Two glass plates are covered with the mixture, dried at a temperature of 100° C. and united between horizontal metal plates heated to 150° C., while adjusting the distance of the metal plates by washers or the like. The thickness of the washers may be so selected, that a layer of glass of a thickness of 0.5 mm. is formed.

*Example II.*—The process is carried out according to Example I but between the glass plates covered with the adhesive a sheet of celluloid of a thickness of 0.5 mm. is interposed. The washers between the metal plates are so adjusted, that the distance of the glass plates will be finally 0.7 mm.

*Example III.*—Two glass plates are covered with a mixture of 40 parts of highly polymerized vinyl acetate, 60 parts of spirit, 15 parts of the diethyl ester of phthalic acid and 15 parts of benzylbenzoate. After evaporating the spirit, the glass plates are united with their covered sides in a frame having a separation of for instance 0.5 mm. They are then heated in a dryer to 100-140° C., till the layer has been freed of bubbles. A laminated glass of excellent durability is obtained.

*Example IV.*—The process is carried out as in Example I but a mixture of the following composition is applied: 160 parts of a solution containing 25% of the polymerized methyl ester of acrylic acid dissolved in ethylacetate are mixed with 15 parts of benzylbenzoate and 15 parts of the diethylic ester of phthalic acid.

*Example V.*—The process is carried out as in the foregoing example but between the glass plates covered with the adhesive, a sheet of highly viscous polymerized vinyl alcohol of a thickness of 0.4 mm. is interposed. The washers between the metal plates are so adjusted that the distance of the glass plates will be finally 0.6 mm.

*Example VI.*—The process is carried out according to Example I but a mixture of the following composition is applied: 55 parts of cellulose acetate are dissolved in 45 parts of the diethyl ester of phthalic acid. The temperature for uniting the plates is about 30° C.

It is to be understood that the form of the invention herewith shown and described is to be taken as the preferred embodiment of the same, and that various changes in the shape, size and arrangement of parts may be resorted to without departing from the spirit of the invention or the scope of the appended claims.

We claim as our invention:

1. Laminated glass comprising spaced parallel plates of glass and an intermediate layer of adhesive material free from bubbles uniting said plates of glass substantially without tension.

2. Process of producing laminated glass of definite predetermined thickness which comprises interposing a layer of thickly liquid adhesive material between parallel plates of glass, exerting a compacting pressure on said sandwiched plates slightly in excess of that necessary to produce flow in the adhesive material so that no substantial strains are set up in the adhesive during the compacting step, relieving all applied pressure when the laminated product reaches a predetermined thickness and allowing the adhesive to set without substantial pressure whereby a laminated glass sheet of predetermined thickness is produced without strain in the adhesive layer.

3. Process of producing laminated glass of definite predetermined thickness which comprises interposing a layer of thickly liquid adhesive material between parallel plates of glass, inserting the sandwiched plates and adhesive material between a pair of rigid pressure surfaces, inserting between said pressure surfaces spacers of a thickness equal to the desired final thickness of the laminated glass, exerting a compacting pressure on said pressure surfaces slightly in excess of that necessary to produce flow in the adhesive material so that no substantial strains are set up in the adhesive during the compacting step, relieving all applied pressure when the laminated product reaches a predetermined thickness permitted by said spacers and allowing the adhesive to set without substantial pressure whereby a laminated glass sheet of predetermined thickness is produced without strain in the adhesive layer.

4. Process of producing laminated glass of definite predetermined thickness which comprises interposing between parallel plates of glass a layer of adhesive material capable of being liquefied by heat, inserting the sandwiched plates and adhesive material between a pair of rigid pressure surfaces, inserting between said pressure surfaces spacers of a thickness equal to the desired final thickness of the laminated glass, heating said pressure surfaces and exerting thereon a compacting pressure slightly in excess of that necessary to produce flow in the adhesive material so that no substantial strains are set up in the adhesive during the compacting step, cooling said pressure surfaces and relieving all applied pressure when the laminated product reaches a predetermined thickness permitted by said spacers and allowing the adhesive to set without substantial pressure whereby a laminated glass sheet of predetermined thickness is produced without strain in the adhesive layer.

WILLY O. HERRMANN.
ERICH BAUM.